(12) United States Patent
Ebihara et al.

(10) Patent No.: US 7,212,211 B2
(45) Date of Patent: May 1, 2007

(54) DATA PROCESSING SYSTEM AND METHOD, COMPUTER PROGRAM, AND RECORDING MEDIUM

(75) Inventors: Hitoshi Ebihara, Kanagawa (JP); Yuichi Nakamura, Tokyo (JP)

(73) Assignee: Sony Computer Entertainment Inc. (JP)

( * ) Notice: Subject to any disclaimer, the term of this patent is extended or adjusted under 35 U.S.C. 154(b) by 1157 days.

(21) Appl. No.: 09/974,608

(22) Filed: Oct. 10, 2001

(65) Prior Publication Data

US 2002/0052955 A1 May 2, 2002

(30) Foreign Application Priority Data

Oct. 10, 2000 (JP) ............................ P2000-309787
Oct. 2, 2001 (JP) ............................ P2001-306962

(51) Int. Cl.
*G06T 1/20* (2006.01)
*G06F 13/14* (2006.01)
*G06F 13/18* (2006.01)

(52) U.S. Cl. ....................... 345/506; 345/535; 345/520
(58) Field of Classification Search ................ 345/506, 345/535, 520; 382/282; 718/105
See application file for complete search history.

(56) References Cited

U.S. PATENT DOCUMENTS 5,237,686 A * 8/1993 Asano et al. ................ 718/105
6,329,996 B1 * 12/2001 Bowen et al. ............... 345/506
6,384,833 B1 * 5/2002 Denneau et al. ............. 345/522
6,434,590 B1 * 8/2002 Blelloch et al. ............. 718/102
6,570,571 B1 * 5/2003 Morozumi ................... 345/505
6,728,420 B2 * 4/2004 Tsunashima et al. ........ 382/282
6,753,878 B1 * 6/2004 Heirich et al. ............... 345/629

FOREIGN PATENT DOCUMENTS

JP 4-131960 A 5/1992
JP 8-138060 A 5/1996

* cited by examiner

*Primary Examiner*—Kee M. Tung
*Assistant Examiner*—Hau Nguyen
(74) *Attorney, Agent, or Firm*—Lerner, David, Littenberg, Krumholz & Mentlik, LLP (57) ABSTRACT

The present invention provides data processing technology for making two or more processing units cooperate with one another such that output data from respective groups of processing units (GSM) are merged by a respective sub-MG (merger), data from the sub-MGs are merged by a main MG, and the merged output data are displayed on a display unit. Each GSM initiates drawing processing assigned thereto in response to the reception of a drawing enable signal and, after execution of the processing, outputs a drawing end signal. The GSMs to which the drawing enable signal is to be sent, and the GSMs from which the drawing end signal is to be received, are set for each application. A main SYNC sends the drawing enable signal to corresponding GSMs in the order of setting for an application in response to the reception of a processing request from the application, while it receives the drawing end signal from the corresponding GSMs so that the processing results of the GSMs will be displayed on the display unit.

15 Claims, 8 Drawing Sheets

| APPLICATION No.X | | |
|---|---|---|
| 1 | GSM1 − 0<br>GSM1 − 1 | GSM1 − 2<br>GSM1 − 3 | ← DISPLAY END
| 2 | GSM2 − 0<br>GSM2 − 1 | GSM2 − 2<br>GSM2 − 3 | ← DISPLAY START
| 3 | GSM3 − 0<br>GSM3 − 1 | GSM3 − 2<br>GSM3 − 3 | ← DISPLAY END
| 4 | GSM4 − 0<br>GSM4 − 1 | GSM4 − 2<br>GSM4 − 3 | ← DISPLAY START

(b)

| APPLICATION No.X | | |
|---|---|---|
| 1 | GSM1 − 0<br>GSM1 − 1 | GSM1 − 2<br>GSM1 − 3 | ← DISPLAY END / DISPLAY START
| 2 | GSM2 − 0<br>GSM2 − 1 | GSM2 − 2<br>GSM2 − 3 | ← DISPLAY END / DISPLAY START
| 3 | GSM3 − 0<br>GSM3 − 1 | GSM3 − 2<br>GSM3 − 3 | ← DISPLAY END / DISPLAY START
| 4 | GSM4 − 0<br>GSM4 − 1 | GSM4 − 2<br>GSM4 − 3 | ← DISPLAY END / DISPLAY START

DATA PROCESSING SYSTEM AND METHOD, COMPUTER PROGRAM, AND RECORDING MEDIUM

CROSS-REFERENCE TO RELATED APPLICATIONS

This application is based upon and claims the benefit of priorities from the prior Japanese Patent Applications No. 2000-309787 filed on Oct. 10, 2000 and No. 2001-306962 filed on Oct. 2, 2001, the entire contents of both of which are incorporated herein by reference.

BACKGROUND OF THE INVENTION

The present invention relates to data communication technologies for making two or more processors such as image processors cooperate to efficiently make a large-screen display of motion picture.

As processors such as computers grow more sophisticated, the use of such computers sets up the environment for more sophisticated information processing than conventional. Expectations nowadays are running high for cooperative operation of two or more image processors to carry out processing for a large-screen display of motion picture.

An increase in processing power of each individual processor, however, may not lead to effective use of its processing power except if the processing mode is efficiently coordinated between processors. When image processors cooperate to make a large-screen display of motion picture, improper data processing therebetween runs a danger of reducing the number of image frames per second or may result in system downtime.

To solve such problems, two or more processors may cooperate to share the display area or processing region on an image plane. In this case, however, making two or more processors share the load of processing a processing request from an application (an application program) causes each processor to take a complicated control form.

SUMMARY OF THE INVENTION

It is a main object of the present invention to provide a data processing technique for enabling coordination between two or more processing units in terms of processing power.

According to one aspect of the present invention, there is provided a data processing system including a plurality of processing units and control means for controlling operations of the processing units, such that each processing unit initiates processing assigned thereto, in response to reception of an execution enable signal sent from the control means, and after execution of the processing, each processing unit sends a processing result and an execution end signal to the control means, wherein the control means has a processing table for each application, the processing table storing, in a predetermined order, identification information on one or more processing units to which the execution enable signal is to be sent, and identification information on one or more processing units from which the processing result and the execution end signal are to be received, whereby, in response to receipt of a processing request from an application, the execution enable signal is sent to the one or more processing units and the processing result and the execution end signal are received from the one or more processing units, in the order determined by the corresponding processing table for the application.

According to another aspect of the present invention, there is provided a data processing system comprising: M first arbitrator means (where M is a natural number greater than one) each for arbitrating operations of corresponding N processing units (where N is a natural number greater than one), the N processing units cooperating to perform cooperative processing, second arbitrator means for arbitrating operations of the M first arbitrator means, and control means for controlling operations of the first and second arbitrator means, such that each processing unit initiates processing assigned thereto, in response to reception of an execution enable signal sent from the control means, and after execution of the processing, each processing unit sends a processing result and an execution end signal to the control means, wherein the control means has a processing table for each application, the processing table storing, in a predetermined order, identification information on one or more processing units to which the execution enable signal is to be sent, and identification information on one or more processing units from which the processing result and the execution end signal are to be received, whereby, in response to receipt of a processing request from an application, the execution enable signal is sent to the one or more processing units and the processing result and the execution end signal are received from the one or re processing units, in the order determined by the corresponding processing table for the application.

It may be arranged that the processing units cooperate with one another to create frame image data with respect to divided images of a predetermined image, and output the created frame image data as the processing results.

It may be arranged that each of the processing units includes drawing processing means for drawing a predetermined image, a plurality of geometry processing means for performing geometry processing on the basis of predetermined image display instructions, and an image interface which intervenes between the drawing processing means and the geometry processing means, and the drawing processing means includes a buffer for storing, together with identification information, drawing contexts that are different in the contents from one another for each of the geometry processing means, and means for reading a specific drawing context from the buffer in response to input of a drawing instruction from the image interface and drawing an image based on the read drawing context, such that each of the geometry processing means performs geometry processing independently on the basis of the image display instructions and sends to the image interface an image transfer request containing the identification information on the drawing context acquired as a result of the geometry processing together with information indicative of priority given thereto, and the image interface receives the image transfer requests from the geometry processing means in the order of priority to sequentially input the drawing instructions to the drawing processing means, whereby a result of the image drawing performed by the drawing processing means is output as the processing result.

It may be arranged that the system further comprises means for displaying the results of the image drawing respectively performed by the processing units, on one display screen at the same time.

It may be arranged that the system further comprises means for displaying the results of the image drawing respectively performed by the processing units, on one display screen in sequence.

According to another aspect of the present invention, there is provided a data processing system for controlling operations of a plurality of processing units, such that each processing unit initiates processing assigned thereto, in response to reception of an execution enable signal, and after execution of the processing, each processing unit outputs a processing result and an execution end signal, the system comprising: first means for holding a processing table for each application, the processing table storing, in a predetermined order, identification information on one or more processing units to which the execution enable signal is to be sent, and identification information on one or more processing units from which the processing result and the execution end signal are to be received; second means for, in response to receipt of a processing request from an application, identifying a corresponding processing table for the application; and third means for sending the execution enable signal to the one or more processing units and receiving the processing result and the execution end signal from the one or more processing units, in the order determined by the identified processing table.

According to another aspect of the present invention, there is provided a data processing system for controlling operations of M first arbitrator means (where M is a natural number greater than one) each for arbitrating operations of corresponding N processing units (where N is a natural number greater than one), the N processing units cooperating to perform cooperative processing, and an operation of second arbitrator means for arbitrating the operations of the M first arbitrator means, such that each processing unit initiates processing assigned thereto, in response to reception of an execution enable signal, and after execution of the processing, each processing unit outputs a processing result and an execution end signal, the system comprising: first means for holding a processing table for each application, the processing table storing, in a predetermined order, identification information on one or more processing units to which the execution enable signal is to be sent, and identification information on one or more processing units from which the processing result and the execution end signal are to be received; second means for, in response to receipt of a processing request from an application, identifying a corresponding processing table for the application; and third means for sending the execution enable signal to the one or more processing units and receiving the processing result and the execution end signal from the one or more processing units, in the order determined by the identified processing table.

It may be arranged that each of the processing units is a computer having a communication capability, whereby the execution enable signal and the execution end signal are exchanged with respect to at least the processing units through a computer network.

According to another aspect of the present invention, there is provided a data processing method for controlling a plurality of processing units each initiating processing assigned thereto, in response to reception of an execution enable signal, and after execution of the processing, each outputting a processing result and an execution end signal, so that the processing results from part of or all of the processing units are displayed on a display unit, the method comprising the steps of: setting, in a predetermined order for each application, identification information on one or more processing units to which the execution enable signal is to be sent, and identification information on one or more processing units from which the processing result and the execution end signal are to be received; sending, in response to receipt of a processing request from an application, the execution enable signal to the one or more processing units and receiving the processing result and the execution end signal from the one or more processing units, in the order determined for the application; and displaying the received processing result at a predetermined timing on the display unit.

According to another aspect of the present invention, there is provided a computer program for causing a computer to operate as a data processing system which controls operations of a plurality of processing units each initiating processing assigned thereto, in response to reception of an execution enable signal, and after execution of the processing, each outputting a processing result and an execution end signal, the data processing system comprising: first means for holding a processing table for each application, the processing table storing, in a predetermined order, identification information on one or more processing units to which the execution enable signal is to be sent, and identification information on one or more processing units from which the processing result and the execution end signal are to be received; second means for, in response to receipt of a processing request from an application, identifying a corresponding processing table for the application; and third means for sending the execution enable signal to the one or more processing units and receiving the processing result and the execution end signal from the one or more processing units, in the order determined by the identified processing table.

It may be arranged that the foregoing computer program is recorded in a computer-readable recording medium.

BRIEF DESCRIPTION OF THE DRAWINGS

In FIG. 5, (a) is a flowchart for explaining image processing steps in the single buffer system, and (b) is a flowchart for explaining image processing steps in the double buffer system.

FIG. 6 is a flowchart for explaining total processing steps executed by a main MG and the like.

DETAILED DESCRIPTION

Hereinbelow, embodiments of the present invention will be described.

(First Embodiment)

A description will now be made of an embodiment in which a data processing system according to the present invention is applied to an integrated image processing apparatus provided with two or more image processing units that carry out cooperative processing.

In the embodiment, the processing units are image processing units, and the data processing performed by the image processing units is image (creation) processing. Further, an execution enable signal is a drawing enable signal (DrawNext) to be output to each image processing unit, while an execution end signal is a drawing end signal (DrawDone) to be output from each image processing unit.

<General Structure>

Figure 1:
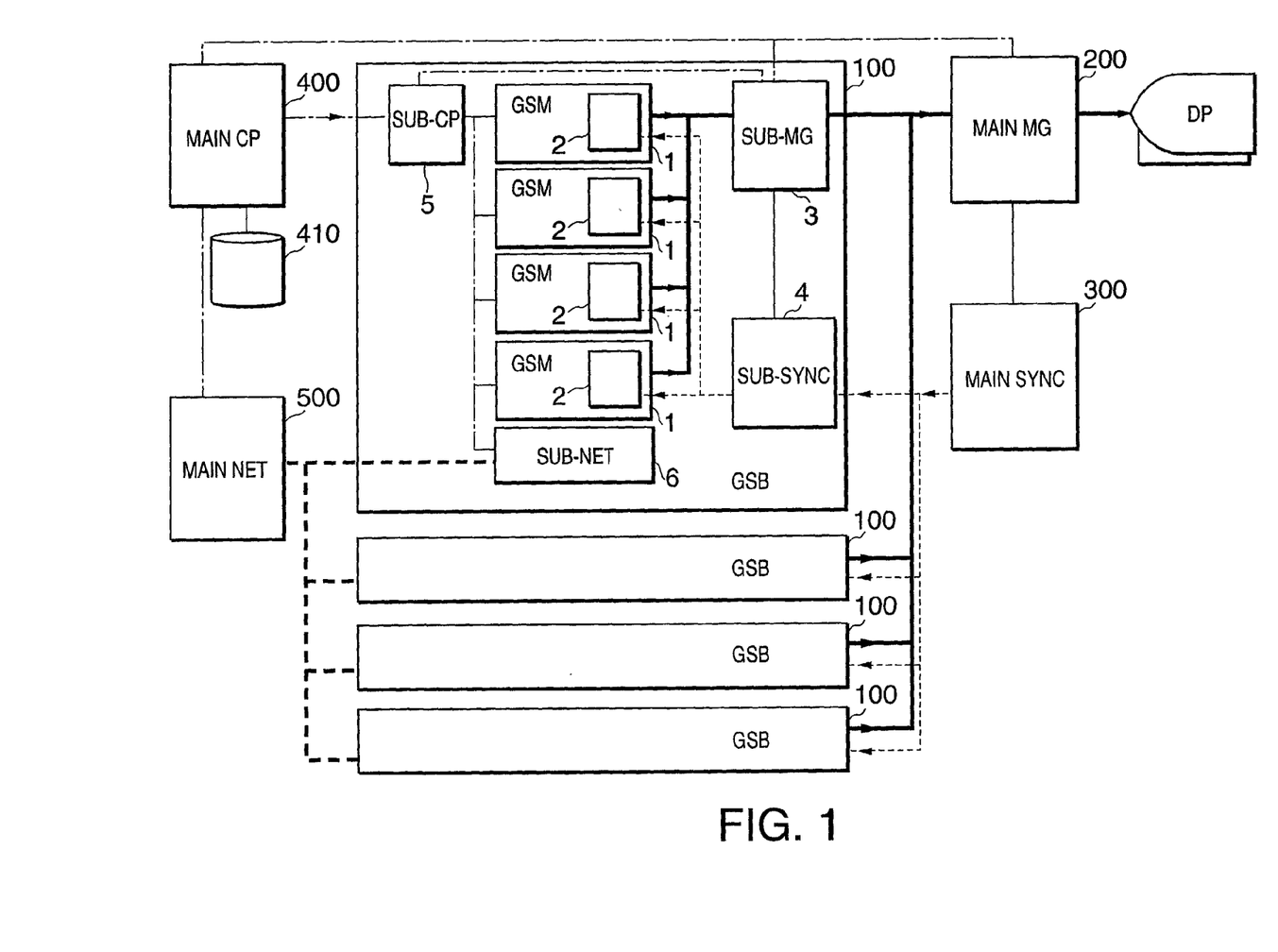
FIG. 1 is a block diagram of an integrated image processing apparatus according to an embodiment of the present invention.

FIG. 1 is a block diagram showing the general structure of the integrated image processing apparatus in this embodiment. The integrated image processing apparatus includes four image processing units (hereinafter called "GSB") 100, an integrator or merger (hereinafter called "main MG") 200, a synchronizing circuit (hereinafter called "main SYNC") 300, a control unit ((hereinafter called "main CP") 400, and a network control circuit (hereinafter called "main NET") 500. The main MG 200 is located at the subsequent stage of each GSB 100 so that output data from the respective GSBs 100 will be merged. The main SYNC 300 supplies each GSB 100 with a synchronizing signal (V-SYNC) and a drawing enable signal (DrawNext) while it transmits to the main MG 200 a drawing end signal (DrawDone) sent from each GSB 100. The main CP 400 manages and controls the entire apparatus. The main NET 500 makes all the GSBs 100 cooperate with one another.

A display unit DP is connected to the output side of the main MG 200 so that the results of image processing in the integrated image processing apparatus will be displayed thereon in a merged form.

Timing of sending various data from the main SYNC 300 to each GSM 1 to be described later is controlled by the main MG 200 in cooperation with the main CP 400. The main CP 400 is connected with the main MG 200, an external storage 410 and the main NET 500.

<GSB>

Each GSB 100 includes four information processing units (hereinafter called "GSM") 1, a merger (hereinafter called "sub-MG") 3, a synchronizing circuit (hereinafter called "sub-SYNC") 4, a control unit (hereinafter called "sub-CP") 5, and a network control circuit (hereinafter called "sub-NET") 6. Each GSM 1 creates frame image data corresponding to an image data string input thereto. The sub-MG 3 merges frame image data output from the GSMs 1 into one frame data to output the same to subsequent-stage processing. The sub-SYNC 4 supplies each GSM 1 with a synchronizing signal (V-SYNC) and a drawing enable signal (DrawNext), while it transmits to the main SYNC 300 a drawing end signal (DrawDone) output from each GSM 1. The sub-CP 5 controls the operation of each GSM 1. The sub-NET 6 makes all the GSMs 1 in both the same GSB and other GSBs cooperate with one another.

Each GSM 1 is equipped with a synchronizing circuit (hereinafter called "SYNC-GSM") 2 which supplies the internal circuitry with the V-SYNC and the drawing enable signal (DrawNext).

The sub-MG 3 and the main MG 200 are each equipped with a data register for temporarily storing frame image data to be output.

The sub-CP 5 controls the operation of the entire GSB. The sub-CP 5 is equipped with a demultiplexer (not shown) for dividing the input data into four parts and distributing to each of the four GSMs 1 a quarter of the image data string related to a moving image to be generated. The distribution may take various forms depending on the application software run on the apparatus. For example, the whole area of an image to be finally displayed may be divided into four parts, or into four image data strings, each of which is to display a corresponding layer to be superimposed one upon another for the final image. Alternatively, image data that has combined four frames into one may be divided into four parts.

The sub-NET 6 is a circuit for passing part or all of the image data string between its own GSB and another GSB. The image data string is passed mainly to balance the load of image processing among the GSBs.

It should be noted that merging performed by the sub-MG 3 is carried out in synchronization with an absolute time base that controls the operation of all the GSBs. In other words, the sub-MG 3 merges two or more pieces of frame image data input in synchronization with the absolute time base to generate one frame of image data.

Each GSB 100 is supplied with an image data string (from the main CP 400 through the sub-CP 5), and the V-SYNC and the drawing enable signal (DrawNext) (from the main SYNC 300 through the sub-SYNC 4). The GSM 1 that has received the drawing enable signal (DrawNext) initiates image processing for the image data string input thereto.

The SYNC-GSM 2, the sub-SYNC 4 and the main SYNC 300 each incorporate a data register and two or more counters therein. Each counter includes a register for holding its count value, so that an interrupt occurs when the count value reaches a predetermined value. Of these counters, a first counter is to make two or more GSMs 1 operate in synchronization with each other. The first counter is incremented at the falling edge of an input synchronizing signal ("V-SYNC"). Although the V-SYNC is asynchronous to the bus clock, since the V-SYNC used is sampled by a first clock, the increment timing may be varied by one clock between GSMs. The count value is reset by a reset signal from the main CP 400. However, since the reset signal is coupled with an asynchronous clear terminal of each counter module, a fluctuation of one clock may occur between GSMs as viewed from the first clock as the reference.

The second counter is an up counter for measuring a precise time interval between V-SYNCs, and is forcefully reset to zero each time it detects the falling edge of an input synchronizing signal V-SYNC.

<GSM>

Each GSM 1 is activated at the time at which the V-SYNC is input to the SYNC-GSM 2, and it initiates image processing in response to the reception of the drawing enable signal (DrawNext) to create frame image data corresponding to the input image data string. Each data piece of the image data string is read and supplied from the external storage 410 connected to the main CP 400, and processed in a predetermined manner to form frame image data. The frame image data enable the display unit DP to display an image on the screen thereof.

After execution of the processing assigned thereto, the GSM 1 concerned sends the processing results to the main MG 200 through the sub-MG 3, and the drawing end signal (DrawDone) to the main SYNC 300 through the SYNC-GSM 2 and the sub-SYNC 4.

Thus the GSMs 1 serve as the nerve center of the integrated image processing apparatus. The functional structure of each GSM 1 according to the embodiment is shown in detail in FIG. 2.

Figure 2:
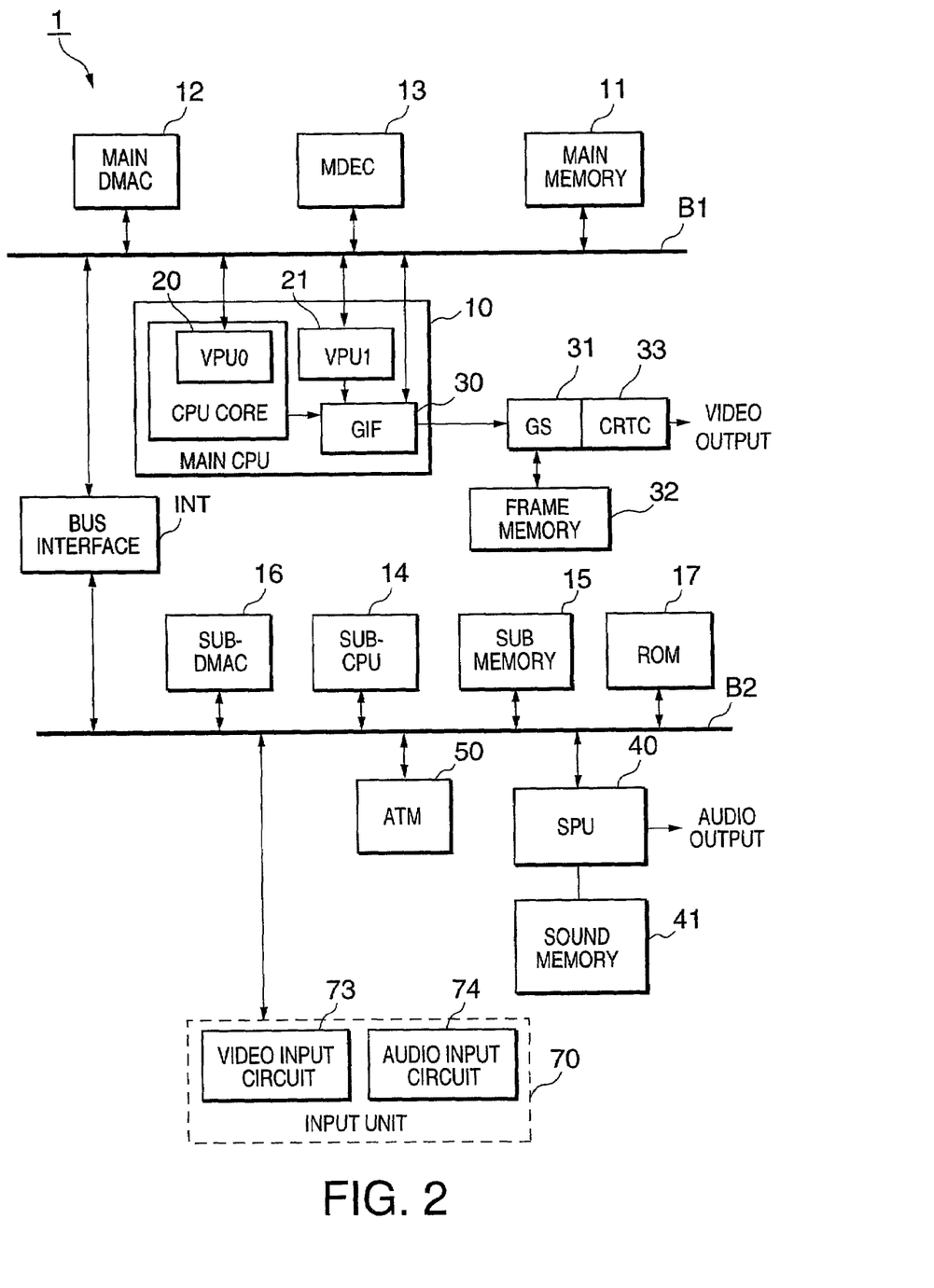
FIG. 2 is a functional block diagram of a GSM.

As shown in FIG. 2, the GSM 1 has two buses, a main bus B1 and a sub-bus B2. These buses B1 and B2 are connected to and disconnected from each other through a bus interface INT. The main bus B1 is connected with a main CPU (Central Processing Unit) 10 and a main memory 11. The main CPU 10 includes a microprocessor and a VPU 0 (where the VPU means Vector Processing unit and the VPU 0 is called the "first VPU" below) 20. The main memory 11 is mainly constituted of a RAM (Random Access Memory). The main bus B1 is also connected with a main DMAC (Direct Memory Access Controller) 12, an MPEG (Motion Picture Experts Group) decoder (MDEC) 13, a VPU 1 (hereinafter called the "second VPU") 21, and a GIF (Graphical Synthesizer Interface) 30 which serves as an arbiter for arbitrating between the first VPU 20 and the second VPU 21. Further, the main bus B1 is connected to drawing processing means ("GS") 31 through the GIF 30. The GS 31 is connected to a CRTC (CRT Controller) 33 for creating frame image data (video output). The CRTC 33 outputs the frame image data to the sub-MG 3.

Upon activation, the main CPU 10 reads a bootstrap program from a ROM 17 on the sub-bus B2 through the bus interface INT, and runs the bootstrap program to start an operating system. The main CPU 10 also cooperates with the first VPU 20 to perform geometry processing for 3D object data composed of basic graphics or geometries (polygons) such as to process coordinate values of the apexes (representative points) of the polygons. A high-speed memory, called an SPR (Scratch Pad RAM), is provided in the main CPU 10 for temporarily storing processing results obtained from the cooperative operation of the main CPU 10 with the first VPU 20.

The first VPU 20 includes two or more operators for computing real numbers of floating points so that floating-point operations are performed in parallel by these operators. In other words, the main CPU 10 and the first VPU 20 cooperate to perform arithmetic processing that requires detailed operations on a polygon basis in the geometry processing. As a result of the arithmetic processing, a display list is created including as its contents polygon definition information such as a series of apex coordinates and shading mode information obtained.

The polygon definition information consists of drawing area setting information and polygon information. The drawing area setting information contains offset coordinates in a frame buffer address to the drawing area, and coordinate data on a drawing clipping area for canceling the drawing operation in the case where the coordinates of a polygon are outside the drawing area. The polygon information consists of polygon attribute information and apex information. The polygon attribute information is to specify a shading mode, an α blending mode, a texture mapping mode, and so on. The apex information contains coordinates in an apex drawing area, coordinates in an apex texture area, apex colors, and so on.

The second VPU 21 is constituted in the same manner as the first VPU 20, that is, it includes two or more operators for computing real numbers of floating points so that floating-point operations will be performed in parallel by these operators. Further the second VPU 21 creates a display list which includes the operation results as its contents.

The first VPU 20 and the second VPU 21, though having the same configuration, serve as geometry engines that share the load of arithmetic processing different in processing contents. In general, the first VPU 20 is assigned processing necessary for complicated computations on something in action such as a character in motion (irregular or free-format geometry processing). On the other hand, the second VPU 21 is assigned processing of objects which are simple but need a large number of polygons such as background buildings (regular or formatted geometry processing). Further, the first VPU 20 performs macro operations in synchronization with a video rate, while the second VPU 21 operates in synchronization with the GS 31. To make the second VPU 21 synchronize with the GS 31, the second VPU 21 is equipped with a direct path direct-coupled to the GS 31. On the other hand, the first VPU 20 is closely coupled to a microprocessor in the main CPU 10 so that complicated processing can easily be programmed.

The display lists created by the first VPU 20 and the second VPU 21 are transferred to the GS 31 through the GIF 30, respectively.

The GIF 30 arbitrates the transfer of the display lists created in the first VPU 20 and the second VPU 21 during the transfer operation. In the embodiment, the GIF 30 has an additional function for putting these display lists in the order of priority and transferring them to the GS 31 sequentially in order of precedence. Information indicative of priority of each display list is generally described in a tag field of the display list when the VPU 20 or 21 creates the display list, but the priority may be judged independently by the GIF 30.

The GS 31 holds drawing context information, so that it reads a corresponding drawing context on the basis of identification information on the image context contained in the display list sent from the GIF 30. The GS 31 then uses the read drawing context to perform rendering for drawing a polygon on a frame buffer 32. Since the frame memory 32 can also be used as a texture memory, any pixel image stored on the frame buffer can be pasted on the polygon to be drawn.

The main DMAC 12 controls not only DMA transfer to each circuit connected to the main bus B1, but also DMA transfer to each circuit connected to the sub-bus B2 according to the state of the bus interface INT.

The MDEC 13 operates in parallel with the main CPU 10 to decompress data compressed, for example, in the MPEG (Motion Picture Experts Group) or JPEG (Joint Photographic Experts Group) format.

The sub-bus B2 is connected with a sub-CPU 14 including a microprocessor, a sub-memory 15 mainly constituted of a RAM, a sub-DMAC 16, and a ROM 17 on which programs such as an operating system are stored. The sub-bus B2 is also connected with a sound processing unit (SPU) 40, which reads tone data accumulated in a sound memory 41 to output the same as an audio output, a communication control unit (ATM) 50 for receiving and sending data, and an input unit 70.

The SYNC-GSM 2 is connected to the sub-bus B2, and the sub-NET 6 is connected to the ATM 50.

The input unit 70 includes a video input circuit 73 for taking in image data from the outside, and an audio input circuit 74 for taking in audio data from the outside.

In the embodiment, an image data string is input from the sub-CP 5 (distributed from the main CP 400) through the video input circuit 73. The sub-CPU 14 controls various operations according to the programs stored in the ROM 17. The sub-DMAC 16 controls operations such as DMA transfer to each circuit connected to the sub-bus B2 only when the bus interface INT disconnects the main bus B1 from the sub-bus B2.

<Data processing>

Next, a description will be made about an exemplary form of data processing executed in the integrated image processing apparatus.

Figure 3:
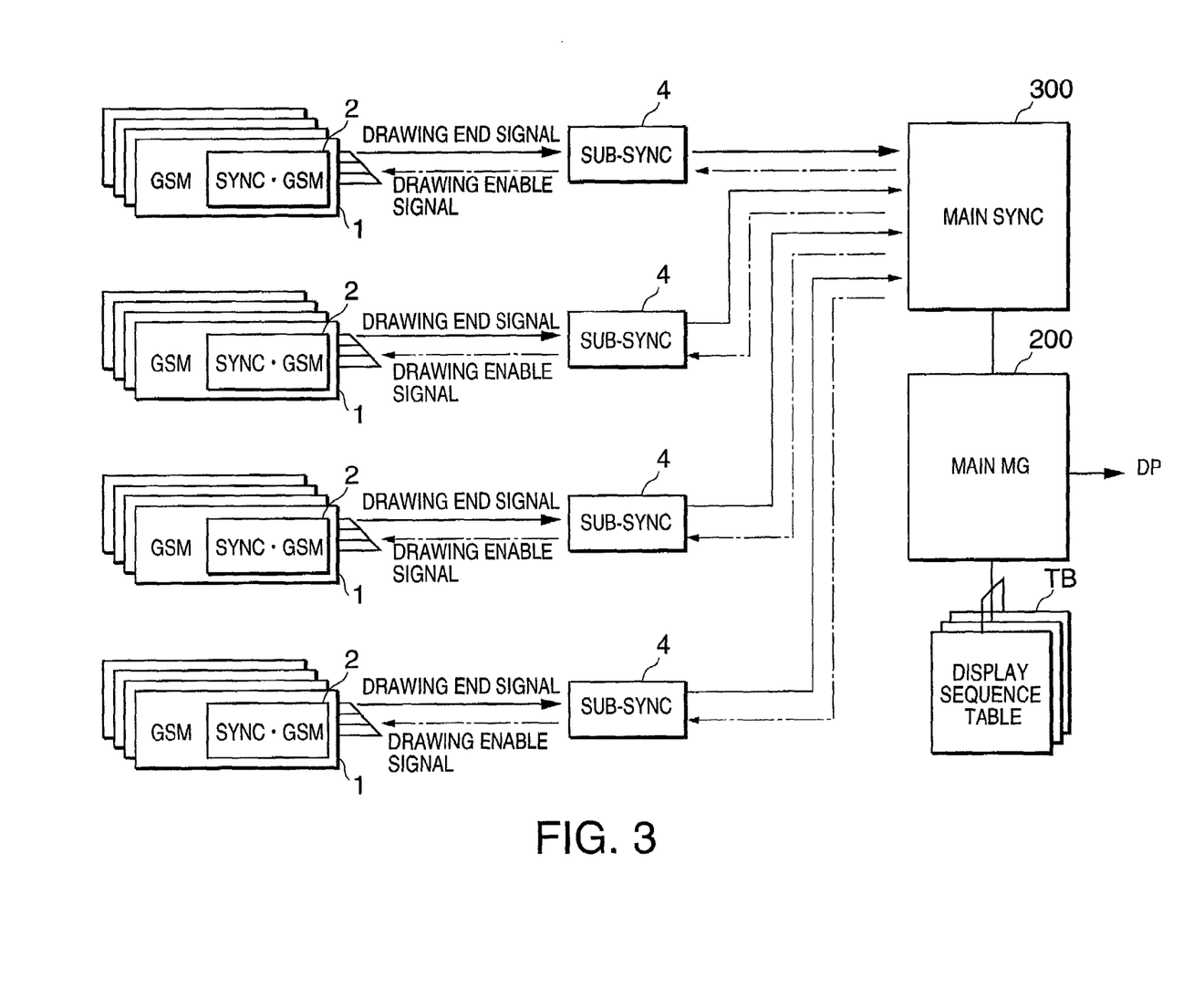
FIG. 3 is a diagram for explaining signals exchanged between the GSMs and a main SYNC.

FIG. 3 is a diagram for explaining signals exchanged between the GSMs 1 and the main SYNC 300 or the main MG 200 as the subsequent-stage processing unit.

In the embodiment, a display sequence table TB is prepared for each application. The display sequence table TB stores in a predetermined order IDs of the GSMs 1 to which the drawing enable signal (DrawNext) is to be sent and IDs of the GSMs 1 from which the drawing end signal (DrawDone) is to be received. The display sequence table TB is provided in any one of the external storage 410 on the main CP 400 side, the data register of the main MG 200, and the data register of the main SYNC 300. In other words, the display sequence table TB is provided in a region in which the main SYNC 300 can point to the contents thereof.

The contents of the display sequence table TB slightly vary between a "single buffer system" and a "double buffer system." The single buffer system is such that each GSM 1 uses a single frame memory 32 to store and read out frame image data as the results of the image processing. The double buffer system is such that each GSM 1 switches between two frame memories 32 to store and read out the frame image data.

Figure 4:
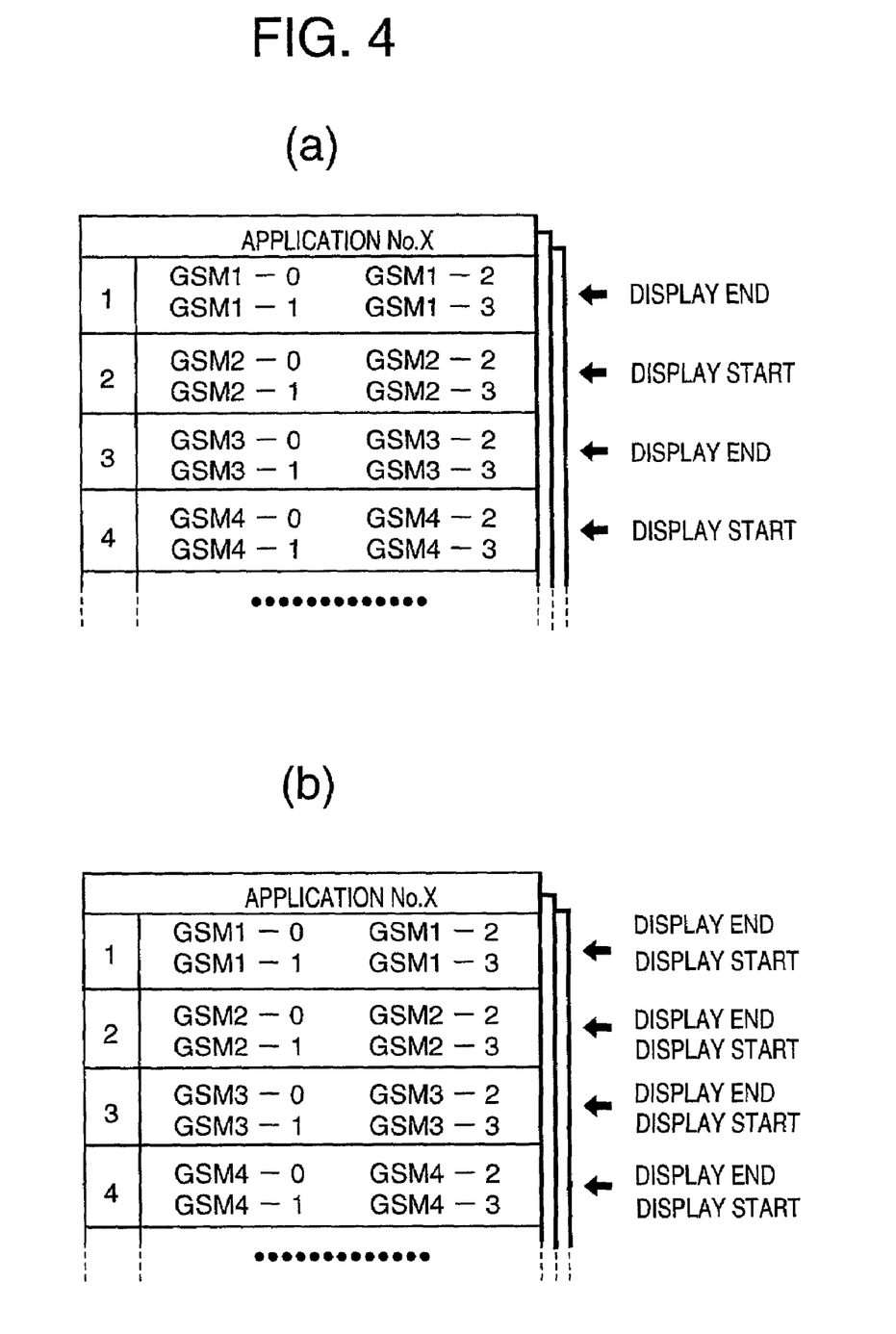
FIG. 4 is a diagram for explaining the contents of display sequence tables, in which (a) indicates use of a single buffer system and (b) indicates use of a double buffer system.

FIG. 4 shows examples of the contents of the display sequence tables TB, in which (a) indicates use of the single buffer system and (b) indicates use of the double buffer system. In either case, the display sequence table TB is specialized by the application number such that when an application is designated, the contents of a display sequence table TB corresponding to the application are specified.

In FIG. 4, GSM 1-0 to GSM 1-3 designates four GSMs provided in the first GSB, GSM 2-0 to GSM 2-3 are four GSMs provided in the second GSB, GSM 3-0 to GSM 3-3 are four GSMs provided in the third GSB, and GSM 4-0 to GSM 4-3 are four GSMs provided in the fourth GSB. Each GSM group is controlled at the timing of one V-SYNC.

The SYNC 300 points (e.g., provides) each GSM group with two indexes "Display Start" and "Display End." The index "Display Start" indicates that the GSM group is scheduled to make an image display on the display unit DP on the basis of the processing results after ending the drawing process (after receiving the drawing end signal (DrawDone)). The index "Display End" indicates that the GSM group is in such a state that it can issue the drawing enable signal for the next frame after a period of display of a one-frame image on the display unit DP. When the single buffer system is adopted, the display of the next frame image is started after completion of the display of the previous frame image. When the double buffer system is adopted, the display start processing and the display end processing are carried out at the same time. Therefore, as shown at (a) and (b) in FIG. 4, the display timing in the single buffer system is delayed by one-SYNC compared to that in the double buffer system.

<Operation Form>

Next, a description will be made about an operation form of the integrated image processing apparatus configured as above. The integrated image processing apparatus operates on the presumption that an application has been loaded into the external storage 410 so that an image data string can be supplied to each GSM 1 through the main CP 400 and the sub-CP 5 in each GSB 100.

Each GSM 1 performs image processing as follows.

Figure 5:
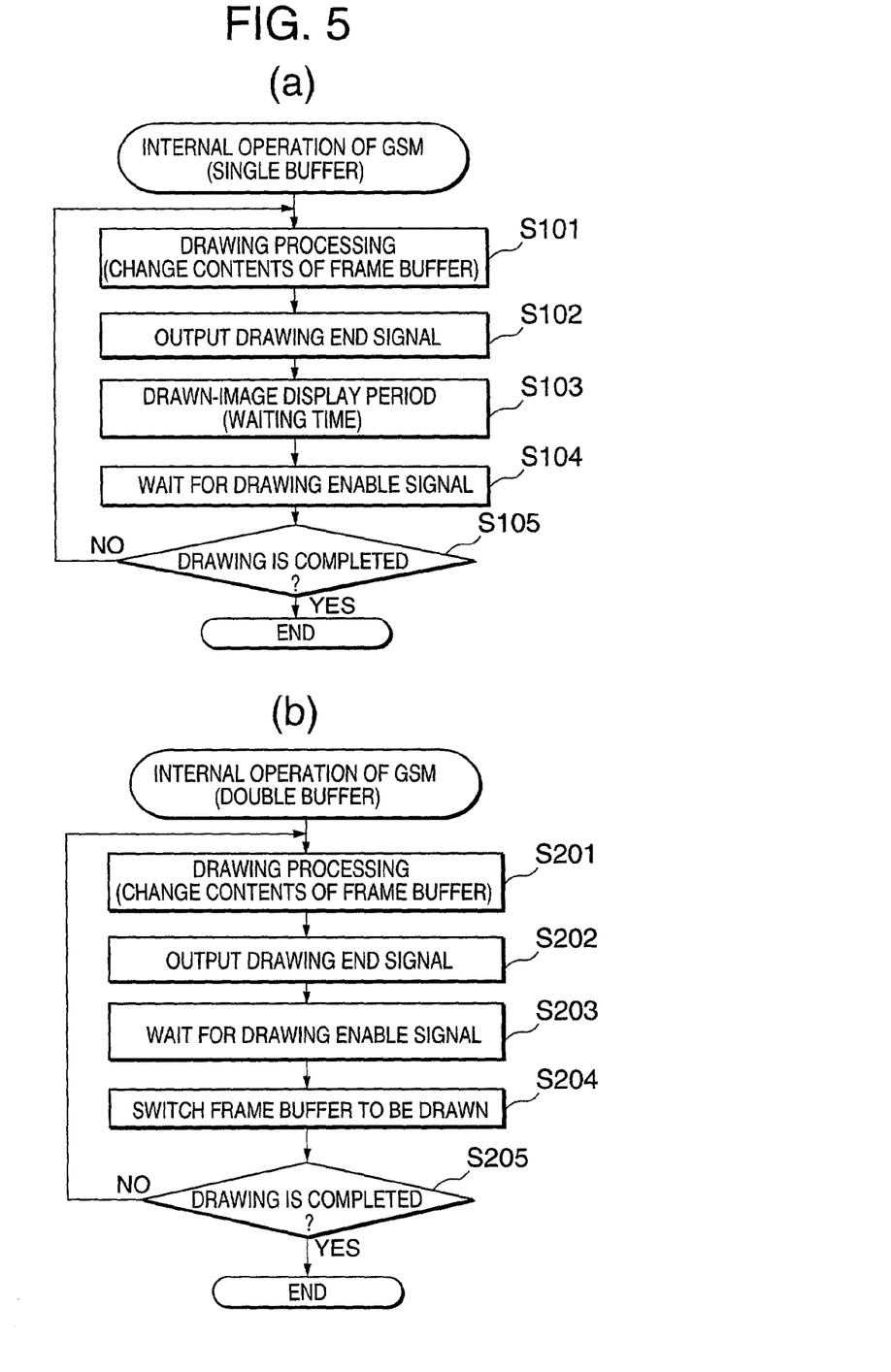

In the single buffer system, the GSM 1 executes processing steps shown at (a) in FIG. 5.

In other words, the GSM 1 performs drawing processing assigned thereto, in response to the reception of the drawing enable signal (DrawNext) (step S101). To be more specific, the GSM 1 changes the contents of the frame buffer. After completion of the drawing processing, the GSM 1 outputs the drawing end signal (DrawDone) (step S102). During a period of display of the drawn image on the display unit DP, the GSM 1 waits until it receives the next drawing enable signal (DrawNext) (steps S103 and S104). In other words, the interval from when the GSM 1 outputs the drawing end signal (DrawDone) until it receives the drawing enable signal (DrawNext) is the image display period (the GSM 1 is kept waiting for a period of at least one V-SYNC). If the GSM 1 runs out of image data to be drawn, the processing is ended (Yes in step S105). If there are more image data to be drawn, the GSM 1 repeats the sequence of operations starting from step S101 (No in step S105).

In the double buffer system, the GSM 1 executes processing steps shown at (b) in FIG. 5.

Like in the single buffer system, the GSM 1 performs drawing processing assigned thereto, in response to the reception of the drawing enable signal (DrawNext). The double buffer system differs from the single buffer system in that the GSM 1 performs drawing processing by switching from one frame buffer (frame memory 32 in FIG. 2) to the other frame buffer. In other words, the buffer for the V-SYNC used for the previous drawing processing is switched to the other frame buffer (steps S204 to S201).

This configuration enables the display unit DP to immediately display the results of the drawing processing on the screen thereof (no waiting time for drawing processing). After completion of the drawing processing, the GSM 1 outputs the drawing end signal (DrawDone) (step S202) and waits for the next drawing enable signal (DrawNext) (step S203). Then the GSM 1 switches the current frame buffer to the other frame buffer for the next drawing processing (step S204). If the GSM 1 runs out of image data to be drawn, the processing is ended (Yes in step S205). If there are more image data to be drawn, the GSM 1 repeats the sequence of operations starting from step S201 (No in step S205).

As a result of the above-mentioned operation of the GSM 1, merged frame image data are stored in the main MG 200. The main MG 200 cooperates with the main SYNC 300 and the main CP 400 to execute processing steps shown in FIG. 6.

Figure 6:
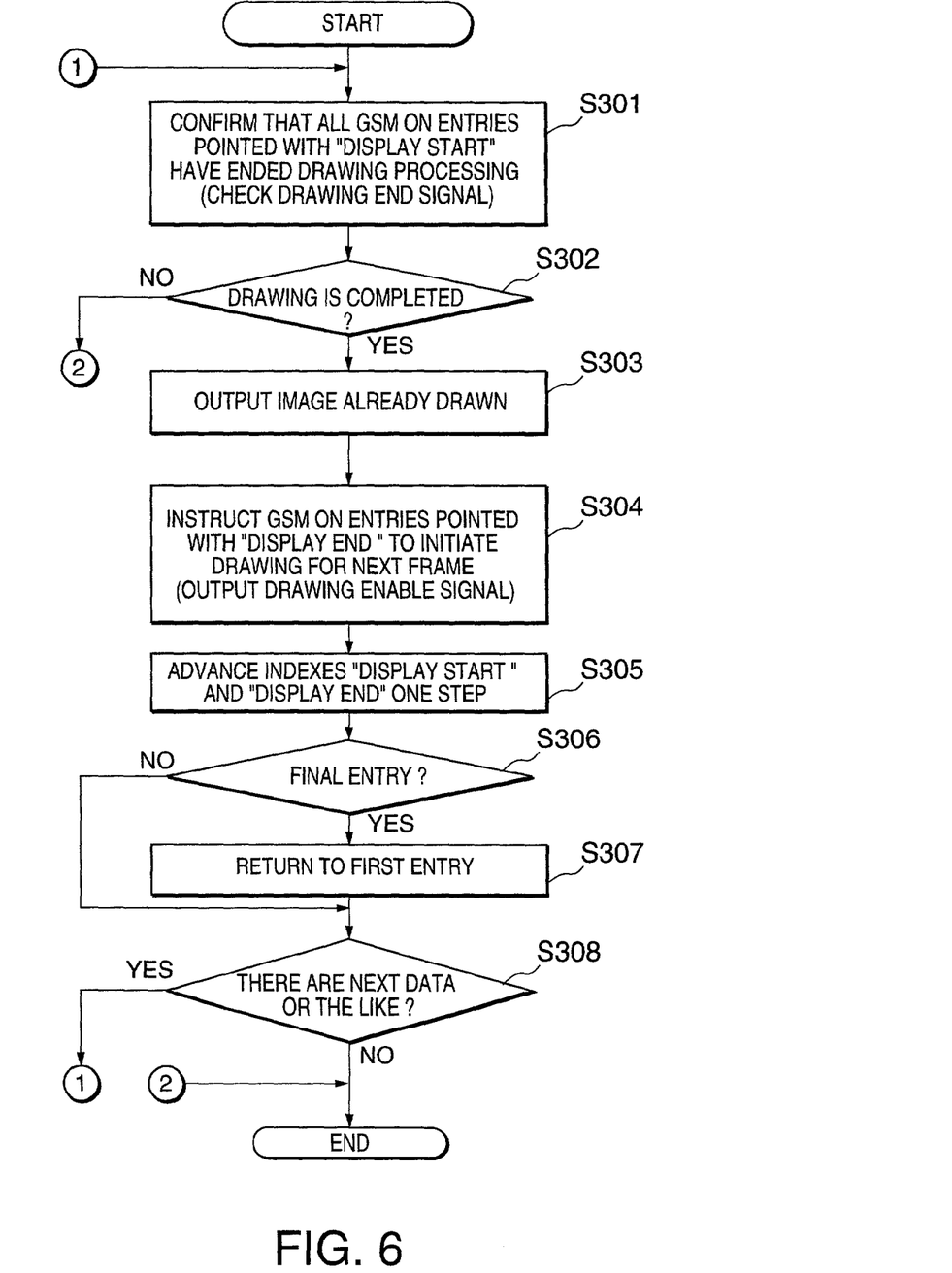

In other words, it is confirmed whether all the GSMs on the entries pointed with the index "Display Start" have completed the drawing processing (step S301). If all has completed the drawing processing, the main MG 200 outputs the processing results (frame image data already processed in the drawing processing) to the display unit DP (step S302 to step S303 if Yes in step S302). If all has not completed the drawing processing yet, the processing is ended because something unusual might have occurred (No in step S302).

After the frame image data are output to the display unit DP, all the GSMs on the entries pointed with the index "Display End" are instructed to perform drawing processing for the next frame. In other words, the drawing enable signal (DrawNext) is output thereto from the main SYNC 300 (step S304). Then each of the indexes "Display Start" and "Display End" is advanced one step (step S305). If the advancement of the indexes reaches the final entry, it returns to the first entry (step S306 to S307 if Yes in step S306). If it does not come to the final entry, or when there are the next data or the like after it returns to the first entry, the sequence of operations starting from step S301 is repeated (Yes in step S308). If there is no next data or the like, the processing is ended (No in step S308).

The cooperative processing of two or more GSMs 1 is thus coordinated, so that even if a large-screen image is to be displayed, processing for making the display can be performed smoothly, thus obtaining a high-quality image on the large screen.

It should be noted that when the GSMs 1 need to cooperate so as to perform drawing processing, the GSMs are coordinated by giving instructions to the sub-NET 6 of each GSB 100 via the main NET 500 so that no inconsistency will occur.

An image resulting from the merging of all the drawing processing performed by these GSMs 1 may be displayed on a screen of the display unit DP at the same time. Alternatively, images resulting from the drawing processing individually performed by the GSMs 1 may be displayed on the screen in sequence.

Figure 7:
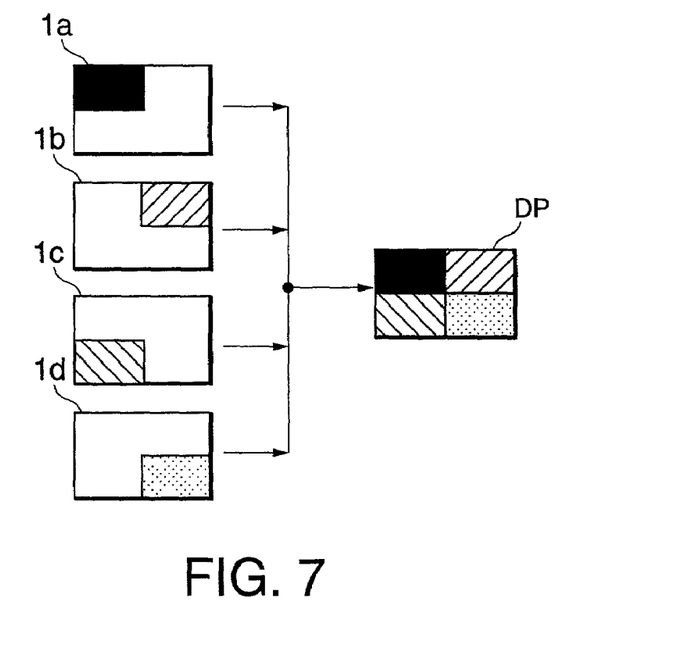
FIG. 7 is an illustration of an example of an image display on which image regions are put together to form a composite image.
Figure 8:
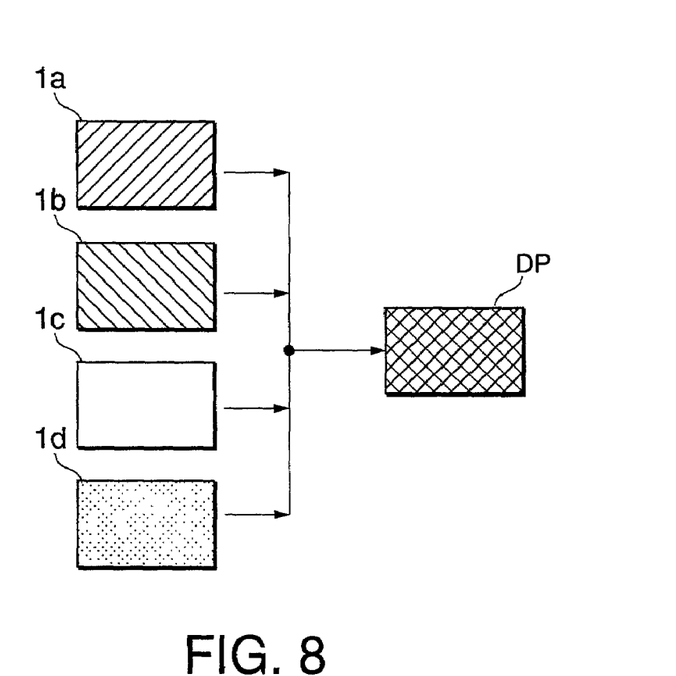
FIG. 8 is an illustration of an example of an image display on which scene anti-aliasing is performed.
Figure 9:
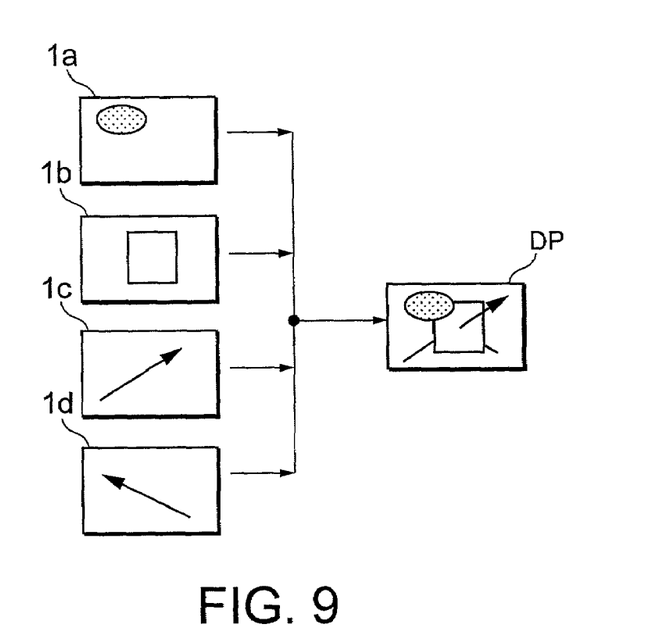
FIG. 9 is an illustration of an example of an image display on which layers are superimposed one upon another.
Figure 10:
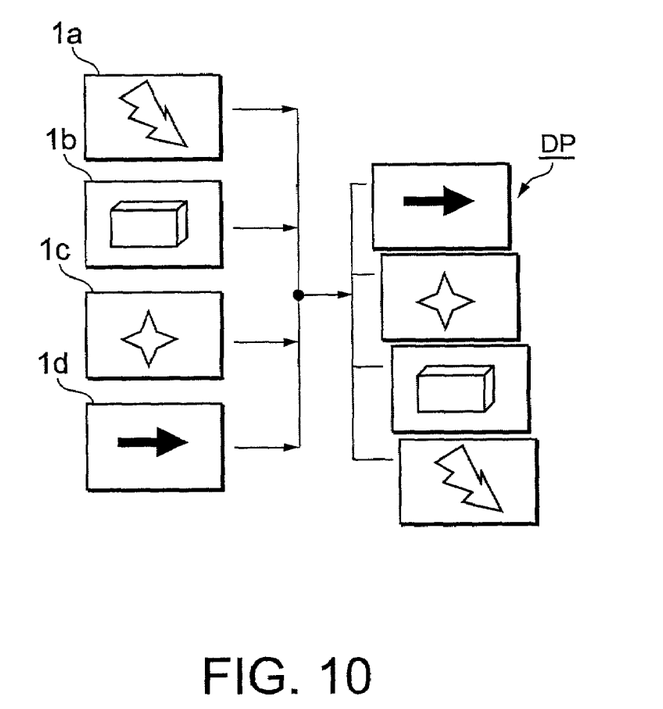
FIG. 10 is an illustration of an example of an image display on which a flip-animation is shown.

FIGS. 7 to 9 show cases where images are displayed on a screen at the same time. FIG. 10 shows a case where images are displayed in sequence.

FIG. 7 shows a case where image regions 1a to 1d resulting from the processing performed by four GSMs are put together to form a composite image on the display unit DP. In this case, each GSM has its own usable region on one screen. Each usable region is identified by the α value of corresponding frame image data. The main MG 200 performs α blending for each frame so that the regions will be put together to output a composite image as one frame.

FIG. 8 shows a case where scene anti-aliasing is performed from four frames 1a to 1d resulting from the processing performed by four GSMs 1. The image frames 1a to 1d created by the four GSMs 1 are identical in the image contents but are displaced on a sub-pixel basis from one another. These image frames are each subjected to a blending so that all the resultant values will be added and averaged, thus performing scene anti-aliasing.

FIG. 9 shows a case where image layers 1a to 1d resulting from the processing performed by four GSMs are superimposed one upon another. In this case, the images 1a to 1d created by the four GSMs 1 are regarded as layers each of which has a fixed priority, and the layers are superimposed one upon another on the basis of the α value in order of precedence. The sequence in which the layers are superimposed can be selected according to the register.

FIG. 10 shows a case where images 1a to 1d resulting from the processing performed by four GSMs are shown in a flip animation. In this case, the images 1a to 1d created by the four GSM are sequentially displayed on a frame basis in a flip animation.

It is very easy to realize the above-mentioned display forms. It has only to prescribe some data, such as a sequence of GSMs 1 to be displayed, on the display sequence table TB.

As discussed above and according to the embodiment, the integrated image processing apparatus is such that a display sequence table TB is provided for each application so that the drawing enable signal (DrawNext) will be sent to corresponding GSMs 1 in the order of prescription on the display sequence table TB. The processing results are then output to the display unit DP in response to the reception of the drawing end signal from each GSM 1. The above-mentioned configuration makes it possible to perform drawing processing without any inconsistency even if the number of GSMs 1 to cooperate with one another increases.

Although in the embodiment description was made about data processing technology for image processing, the data processing technology can also be applied to information processing of other types than the image processing such as processing for generating sound. For example, more delicate, high-quality sound such as in an orchestra concert can be reproduced. In this case, two or more pieces of data for generating sound are individually processed in each GSM 1. Further, a form of complex processing can be considered in which image processing is linked with sound generation. As shown in FIG. 2, the use of GSMs 1 according to the embodiment enables such complex processing. When the information processing involves sound generation, sound data obtained in the processing become signals for outputting tones from a predetermined speaker or speakers. Then the sound data are output in synchronization with the above-mentioned frame image data by means of the above-mentioned sub-MGs 3 and the main MG 200. It should be noted that the sound data to each GSM 1 are input from an audio input circuit 74 and output from an SPU 40 as shown in FIG. 2.

(Second Embodiment)

The first embodiment described an exemplary data processing system included in the integrated image processing apparatus provided with two or more image processing units that cooperate to carry out cooperative processing, but the present invention can be implemented in a network type data processing system.

In other words, the present invention can be implemented in the following network type data processing system. In this case, two or more information processing terminals installed at completely different locations are connected through a computer network such as the Internet. The information processing terminals can operate as the processing units, the arbitrator means, and the control means according to the present invention while inter-exchanging data, such as the above-mentioned drawing enable signal (DrawNext) and drawing end signal (DrawDone), among these information terminals through the computer network.

Some of the information processing terminals serve as the GSBs 100 described in the first embodiment. The other information processing terminals share the following features: the main MG 200 for merging output data of the information processing terminals serving as the GSBs 100, the main SYNC 300 for supplying the synchronizing signal (V-SYNC) and other operating data to each GSB 100, the main CP 400 for managing and controlling the operation of the entire apparatus, and the main NET 500 for making all the GSBs 100 cooperate with one another.

The output side of the information processing terminal serving as the main MG 200 is connected to a display unit. The information processing terminal serving as the main MG 200 controls the timing of sending various data from the main SYNC 300 to each GSB 100. On the other hand, the information processing terminal serving as the main CP 400 is connected to the information processing terminals serving as the main MG 200, the external storage and the main NET, respectively.

The network type data processing system thus configured operates in the same manner as that in the first embodiment.

(Third Embodiment)

Further, the present invention can be implemented in a data processing system which controls two or more processing units (like the above-mentioned GSBs 100 in the case of image processing) that cooperate to perform cooperative processing through a computer network.

Such a data processing system may include a server connectable to the computer network and an external storage accessible to the server. In this case, the server (and a CPU incorporated in the server) reads and executes a computer program stored in the above-mentioned external storage or recorded on a portable recording medium such as a CD-ROM to form a feature as a main control unit.

The main control unit includes the following three functional modules.

The first functional module has the function of holding a processing table in the external storage for each application. The processing table may store, in a predetermined order, identification information on one or more processing units to which an execution enable signal, for example, the above-mentioned drawing enable signal (DrawNext) is to be sent, and identification information on one or more processing units from which the processing results and an execution end signal, for example, the above-mentioned drawing end signal (DrawDone) are to be received.

The second functional module has the function of specifying a processing table for an application in response to the reception of a processing request from the application concerned.

The third functional module has the function of sending the execution enable signal (e.g., (DrawNext)) to corresponding processing units in the order of storage on the processing table specified by the second functional module, while receiving the processing results and the execution end signal (e.g., (DrawDone)) from the corresponding processing units.

The data processing system thus configured operates in the same manner as those in the first and second embodiments, except that the control unit independently controls the operation of each processing unit, which also makes it easy to coordinate two or more processing units in terms of processing power.

As described above and according to the present invention, two or more processing units can easily be coordinated in terms of processing power.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Invention claimed is:

1. A data processing system, comprising:
a plurality of processing units each operable to initiate processing assigned thereto in response to reception of an execution enable signal and to produce a processing result and an execution end signal after completion of said processing;
a respective processing table for each of a plurality of applications, each of said processing tables storing, in a predetermined order, identification information on one or more of said processing units to which said execution enable signal is to be sent, and identification information on one or more of said processing units from which said processing result and said execution end signal are to be received; and
a control unit operable to control said processing units such that, in response to receipt of a processing request from a given application, said execution enable signal is sent to said one or more processing units identified by said respective processing table, and said processing result and said execution end signal are received from said one or more processing units identified by said respective processing table, in said order determined by said respective processing table wherein:
each of said processing units includes drawing processing means for drawing a predetermined image, a plurality of geometry processing means for performing geometry processing based on predetermined image display instructions, and an image interface which intervenes between said drawing processing means and said geometry processing means;
said drawing processing means includes a buffer for storing, together with identification information, different drawing contexts for each of said geometry processing means, and means for reading a specific drawing context from said buffer in response to a drawing instruction from said image interface and for drawing an image based on said drawing context;
each of said geometry processing means is operable to perform geometry processing independently based on said image display instructions and to send to said image interface an image transfer request containing said identification information for said drawing context resulting from said geometry processing together with information indicative of an order of priority given thereto;
said image interface is operable to receive said image transfer requests from said geometry processing means in said order of priority to sequentially input said drawing instructions to said drawing processing means; and
said processing result includes a result of drawing said image by said drawing processing means.

2. The data processing system according to claim 1, wherein said processing units cooperate with one another to create frame image data with respect to divided images of a predetermined image, and to output said created frame image data as said processing result.

3. The data processing system according to claim 1, further comprising means for concurrently displaying said results of drawing said images performed by said processing units, on one display screen.

4. The data processing system according to claim 1, further comprising means for sequentially displaying said results of drawing said images performed by said processing units, on one display screen.

5. A data processing system, comprising:
respective sets of N processing units (where N is a natural number greater than one) each operable to perform cooperative processing such that each processing unit initiates processing assigned thereto in response to reception of an execution enable signal, and produces a processing result and an execution end signal after completing of said processing;
a plurality of M first arbitrator means (where M is a natural number greater than one) each for arbitrating operations of one of said respective sets of N processing units;
second arbitrator means for arbitrating operations of said M first arbitrator means;
a respective processing table for each of a plurality of applications, said processing table storing, in a predetermined order, identification information on one or more of said processing units to which said execution enable signal is to be sent, and identification information on one or more of said processing units from which said processing result and said execution end signal are to be received;
a control unit operable to control said processing units such that, in response to receipt of a processing request from a given application, said execution enable signal is sent to said one or more processing units and said processing result and said execution end signal are received from said one or more processing units, in said order determined by said corresponding processing table for said application.

6. The data processing system according to claim 5, wherein said processing units are operable to cooperate with one another to create frame image data with respect to divided images of a predetermined image, and to output said created frame image data as said processing result.

7. The data processing system according to claim 5, wherein:
each of said processing units includes drawing processing means for drawing a predetermined image, a plurality of geometry processing means for performing geometry processing based on predetermined image display instructions, and an image interface which intervenes between said drawing processing means and said geometry processing means;
said drawing processing means includes a buffer for storing, together with identification information, different drawing contexts for each of said geometry processing means, and means for reading a specific drawing context from said buffer in response to a drawing instruction from said image interface and for drawing an image based on said drawing context;
each of said geometry processing means being operable to perform geometry processing independently based on said image display instructions and to send to said image interface an image transfer request containing said identification information for said drawing context resulting from said geometry processing together with information indicative of an order of priority given thereto;
said image interface being operable to receive said image transfer requests from said geometry processing means in said order of priority to sequentially input said drawing instructions to said drawing processing means; and
said drawing processing means operable to output a result of drawing said image as said processing result.

8. The data processing system according to claim 7, further comprising means for concurrently displaying said results of drawing said image by respective ones of said processing units, on one display screen.

9. The data processing system according to claim 7, further comprising means for sequentially displaying said results of drawing said image by respective ones of said processing units, on one display screen.

10. A data processing system for controlling operations of a plurality of processing units, such that each processing unit is operable to initiate processing assigned thereto in response to reception of an execution enable signal and outputs a processing result and an execution end signal after completion of said processing, said data processing system comprising:
first means for holding a respective processing table for each of a plurality of applications, each of said processing tables storing, in a predetermined order, identification information on one or more of said processing units to which said execution enable signal is to be sent, and identification information on one or more of said processing units from which said processing result and said execution end signal are to be received;
second means for identifying a corresponding one of said processing tables in response to a processing request from a given one of said applications; and
third means for sending said execution enable signal through a network to said one or more processing units identified by said corresponding processing table, and for receiving said processing result and said execution end signal through said network from said one or more processing units identified by said corresponding processing table, in said order determined by said corresponding processing table.

11. A data processing system for controlling a plurality of sets of N processing units (where N is a natural number greater than one), each respective set of N processing units being operable to perform cooperative processing such that each processing unit initiates processing assigned thereto in response to reception of an execution enable signal, and produces a processing result and an execution end signal after completion of said processing, said data processing system comprising
a plurality of M first arbitrator means (where M is a natural number greater than one) each for arbitrating operations of one of said respective sets of N processing units;
a second arbitrator means for arbitrating said operations of said M first arbitrator means;
first means for holding a respective processing table for each of a plurality of applications, each of said processing tables storing, in a predetermined order, identification information on one or more of said processing units to which said execution enable signal is to be sent, and identification information on one or more of said processing units from which said processing result and said execution end signal are to be received;
second means for identifying a corresponding one of said processing tables in response to a processing request from a given one of said applications; and
third means for sending said execution enable signal to said one or more processing units identified by said corresponding processing table and for receiving said processing result and said execution end signal from said one or more processing units identified by said corresponding processing table, in said order determined by said corresponding processing table.

12. The system according to claim 11, wherein each of said processing units includes a computer having a communication capability, whereby said execution enable signal and said execution end signal are exchanged between at least said processing units through a computer network.

13. A data processing method for controlling a plurality of processing units each initiating processing assigned thereto in response to reception of an execution enable signal and outputting a processing result and an execution end signal after completion of said processing, so that said processing results from some or all of said processing units are displayed on a display unit, each of said processing units including a computer having a communication capability, said method comprising:
setting, in a predetermined order f or each of a plurality of applications, identification information on one or more of said processing units to which said execution enable signal is to be sent, and identification information on one or more of said processing units from which said processing result and said execution end signal are to be received;
sending, in response to receipt of a processing request from a given application, said execution enable signal through a network to said one or more processing units identified by said identification information for said given application and receiving said processing result and said execution end signal through said network from said one or more processing units identified by said identification information for said given application, in said order determined for said given application;

displaying said processing result at a predetermined timing on said display unit.

14. A storage medium containing a computer program for causing a computer to operate as a data processing system which controls operations of a plurality of processing units each initiating processing assigned thereto in response to reception of an execution enable signal and outputting a processing result and an execution end signal after completion of said processing, said data processing system comprising:
- first means for holding a respective processing table for each of a plurality of applications, each of said processing tables storing, in a predetermined order, identification information on one or more of said processing units to which said execution enable signal is to be sent, and identification information on one or more of said processing units from which said processing result and said execution end signal are to be received;
- second means for identifying a corresponding one of said processing tables in response to a processing request from a given one of said applications; and
- third means for sending said execution enable signal through a network to said one or more processing units identified by said corresponding processing table, and for receiving said processing result and said execution end signal through said network from said one or more processing units identified by said corresponding processing table, in said order determined by said corresponding processing table.

15. A computer-readable recording medium having a computer program recorded thereon, said computer program being executable by a computer for causing said computer to operate as a data processing system which controls operations of a plurality of processing units, each initiating processing assigned thereto in response to reception of an execution enable signal and outputting a processing result and an execution end signal after completion of said processing, said computer program being executable for performing a method, said method comprising:
- setting, in a predetermined order for each of a plurality of applications, identification information on one or more of said processing units to which said execution enable signal is to be sent, and identification information on one or more of said processing units from which said processing result and said execution end signal are to be received;
- sending, in response to receipt of a processing request from a given application, said execution enable signal through a network to said one or more processing units identified by said identification information for said given application, and receiving said processing result and said execution end signal through said network from said one or more processing units identified by said identification information for said given application in said order determined for said given application; and
- displaying said processing result at a predetermined timing on said display unit.

* * * * *

UNITED STATES PATENT AND TRADEMARK OFFICE
CERTIFICATE OF CORRECTION

PATENT NO. : 7,212,211 B2  Page 1 of 1
APPLICATION NO. : 09/974608
DATED : May 1, 2007
INVENTOR(S) : Hitoshi Ebihara and Yuichi Nakamura It is certified that error appears in the above-identified patent and that said Letters Patent is hereby corrected as shown below:

In the Specification:

Column 2, line 25, "or" should read --more--.

Column 9, line 54, after "GSB 100." insert paragraph: --The main CP 400 launches the application, and when a processing request is made from the application, it gives drawing instructions to the main SYNC 300 through the main MG 200. Upon receipt of the drawing instructions from the main CP 400, the main SYNC 300 sends the drawing enable signal (DrawNext) to corresponding GSMs 1 in the order of storage on the display sequence table TB for the application concerned.--

Column 15, line 60, "f or" should read --for--.

Column 16, line 51, "f or" should read --for--.

Signed and Sealed this

Twenty-ninth Day of April, 2008

JON W. DUDAS
*Director of the United States Patent and Trademark Office*